US008488175B2

(12) United States Patent
Scaff

(10) Patent No.: US 8,488,175 B2
(45) Date of Patent: Jul. 16, 2013

(54) METHOD FOR TRANSFORMING AND TRANSPORTING PRINTER DATA OVER THE INTERNET IN A SECURE AND RELIABLE MANNER

(75) Inventor: Marvin Scaff, Tampa, FL (US)

(73) Assignee: Emerge Print Management, LLC, Tampa, FL (US)

( * ) Notice: Subject to any disclaimer, the term of this patent is extended or adjusted under 35 U.S.C. 154(b) by 0 days.

(21) Appl. No.: 13/416,332

(22) Filed: Mar. 9, 2012

(65) Prior Publication Data

US 2012/0194845 A1 Aug. 2, 2012

Related U.S. Application Data

(63) Continuation of application No. 12/213,116, filed on Jun. 13, 2008, now Pat. No. 8,144,354.

(60) Provisional application No. 60/929,131, filed on Jun. 14, 2007.

(51) Int. Cl.
*G06F 3/12* (2006.01)
*G03G 15/00* (2006.01)

(52) U.S. Cl.
USPC .............. 358/1.15; 709/224; 370/229; 399/8; 399/10

(58) Field of Classification Search
USPC ......... 358/1.15; 370/229; 399/8, 10; 709/224
See application file for complete search history.

(56) References Cited

U.S. PATENT DOCUMENTS

| 5,699,493 | A | * | 12/1997 | Davidson et al. | ............ 358/1.15 |
| 7,920,467 | B2 | * | 4/2011 | Gilmour | ....................... 370/229 |
| 2002/0075496 | A1 | * | 6/2002 | Zhang et al. | ................. 358/1.13 |
| 2002/0184519 | A1 | * | 12/2002 | Wadley | ......................... 713/200 |
| 2003/0071726 | A1 | * | 4/2003 | Hopper et al. | ................ 340/540 |
| 2003/0090712 | A1 | * | 5/2003 | Lenz et al. | .................... 358/1.15 |
| 2003/0229846 | A1 | * | 12/2003 | Sethi et al. | .................... 715/500 |
| 2006/0251114 | A1 | * | 11/2006 | Nuggehalli et al. | .......... 370/466 |
| 2008/0309965 | A1 | * | 12/2008 | Scaff | ............................ 358/1.15 |
| 2008/0312944 | A1 | * | 12/2008 | Scaff | ............................... 705/1 |
| 2009/0147299 | A1 | * | 6/2009 | Tetu | ............................ 358/1.15 |
| 2012/0250089 | A1 | * | 10/2012 | Dietrich et al. | .............. 358/1.15 |

* cited by examiner

*Primary Examiner* — Dennis Dicker
(74) *Attorney, Agent, or Firm* — Gray Robinson, P.A.

(57) ABSTRACT

A method for managing a plurality of printers connected to a network, the method comprising the following steps: scanning the network to obtain printer usage data from the plurality of printers wherein scanning is performed by at least one scan module wherein the at least one scan module gathers printer usage data from a plurality of printers and transmits the gathered printer usage data to a patrol application; receiving the scanned data at the patrol application and compiling the scanned data into a single form; dispatching the single form from the patrol application to a server; and removing the single form from the patrol application if the single form was successfully dispatched to the server.

18 Claims, 3 Drawing Sheets

METHOD FOR TRANSFORMING AND TRANSPORTING PRINTER DATA OVER THE INTERNET IN A SECURE AND RELIABLE MANNER

CROSS-REFERENCE TO RELATED INVENTIONS

This application is a continuation of pending application Ser. No. 12/213,116, filed Jun. 13, 2008, which claimed priority to provisional application No. 60/929,131, filed Jun. 14, 2007, the disclosures of which are hereby incorporated by reference herein.

BACKGROUND OF THE INVENTION

Field of the Invention

The transportation and transformation of the printer data from printers to a central location and knowledge base is an important function for a printer service provider. There are several important elements that are involved with capturing, transforming and transporting the printer data to the central location and knowledge base. These elements include ensuring that all the important and relevant data required by the system is transported and ensuring that a number of special characters which are generally difficult to transport correctly is transported correctly. It is also important to ensure that the information/printer data is secure during transport and to ensure that the information/printer data meets various regulatory requirements for data security including HIPPA, FACTA, SARBANES OXLEY, GRAHAM BLILEY. It is also important to ensure that the information/printer data is reliable and has remained uncorrupted and complete and ensuring that the information/printer data is reliable and accurate to allow diagnosis of any errors that occur.

While previous systems have been able to handle some simple situations on gathering and transporting printer data to central location, the "solutions" provided by these system have been unable to address the situations described earlier. As a result the "solutions" they have implemented have compromised the overall accuracy and integrity of their system and their reporting. Their solutions have also compromised the privacy, security and safety of the systems themselves. The solutions implemented by these systems (1) do not protect the security and privacy of the printer data or the accuracy of the system overall, (2) do not collect and protect the "original" data itself for later analysis and error correction procedures, (3) do not continue and conserve the overall system, (4) do not reliably transport the data without error or need of correction. Specifically, these systems fail because they are not secure; people can spy on them, alter their input streams, and feed them false streams. In addition, important printer information contained in special characters is not sent because the previous systems do not know how to transport this type of information. The lack of this information severely hampers any future diagnosis related to diagnosing system errors. It also presents only limited insight into the printer information itself.

Therefore, it is an object of this invention to provide an improvement which overcomes the aforementioned inadequacies of the prior art devices and provides an improvement which is a significant contribution to the advancement of the printer art.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

One embodiment of the present invention is a method. The method includes transforming printer data into an extensible markup language (XML). The method also includes encapsulating the transformed printer data. The method further includes transmitting the encapsulated printer data. The transforming the printer data and the encapsulating the printer data are configured to maintain security, reliability, and privacy of the printer data.

The method can additionally include capturing complete printer data by reading the encapsulated printer data. The method can also additionally include scanning a network to obtain the printer data, before transforming the printer data into the XML. The scanning can include at least one of the following scans: a simple network management protocol scan, a non shared desktop printers scan, or a jet direct scan. The method can be implemented by a printer service provider configured to monitor printer usage within an enterprise.

The method can be implemented in software. For example, a computer-readable medium can be encoded with instructions that, when executed on a computer, perform the method.

Another embodiment of the present invention is an apparatus. The apparatus includes a transformation unit configured to transform printer data into an extensible markup language (XML). The apparatus also includes an encapsulation unit configured to encapsulate the transformed printer data. The apparatus further includes a transmission unit configured to transmit the encapsulated printer data. The transformation unit and the encapsulation unit are configured to maintain security, reliability, and privacy of the printer data.

The apparatus can also include a capture unit configured to capture complete printer data by reading the encapsulated printer data. The apparatus can also further include a scan unit configured to scan a network to obtain the printer data, before transforming the printer data into the XML. The scan unit can be configured to perform at least one of the following scans: a simple network management protocol scan, a non shared desktop printers scan, or a jet direct scan. The apparatus can include or be included in a printer service provider configured to monitor printer usage within an enterprise.

A further embodiment of the present invention can also be an apparatus. The apparatus includes transformation means for transforming printer data into an extensible markup language (XML). The apparatus also includes encapsulation means for encapsulating the transformed printer data. The apparatus further includes transmission means for transmitting the encapsulated printer data. The transformation means and the encapsulation means include means for maintaining security, reliability, and privacy of the printer data.

The apparatus can also include capture means for capturing complete printer data by reading the encapsulated printer data. The apparatus can further include scan means for scanning a network to obtain the printer data, before transforming the printer data into the XML. The scanning can include at least one of the following scans: a simple network management protocol scan, a non shared desktop printers scan, or a jet direct scan. The apparatus can include or be included in a printer service provider configured to monitor printer usage within an enterprise.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

Similar reference characters refer to similar parts throughout the several views of the drawings.

DETAILED DESCRIPTION OF THE PREFERRED EMBODIMENT

Certain embodiments of the present invention are designed to meter, monitor and provide real time enterprise printing information. The ability to transport the printer data accurately, safely and securely is an element that helps make this system work. Certain embodiments of the present invention, therefore, provide a method of transforming the data into XML and encapsulating that data, thereby allowing the system to accurately capture true printer data including special characters. Capturing the complete printer data, in its original format, with the special characters is an important and significant problem that can be overcome by certain embodiments of the invention.

Figure 1:
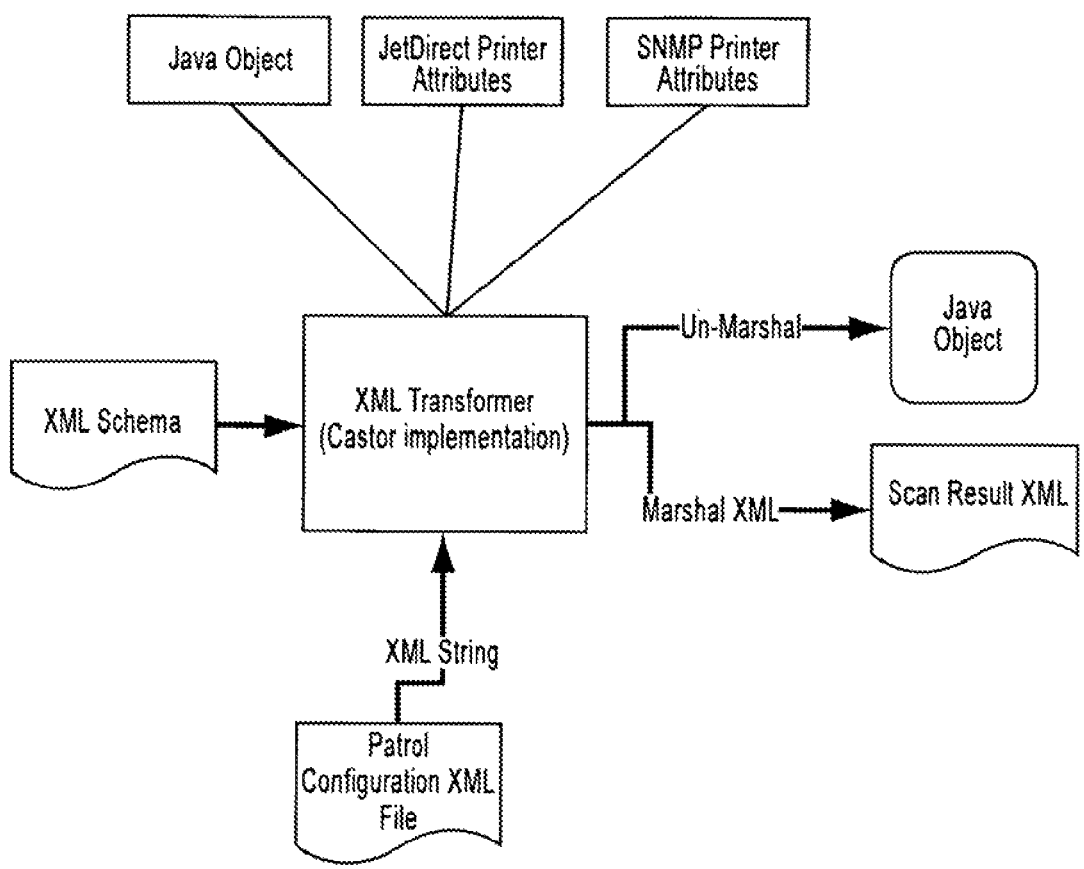
FIG. 1 of the present invention illustrates an embodiment of the invention once information has been collected and is being updated in a knowledge base.

Referring to FIG. 1, the inventive system can include a scanning component for performing various types of scans on the network. Specifically, a patrol application can perform a Simple Network Management Protocol (SNMP) scan, a Non Shared Desktop Printers (NSDP) scan and a Jet Direct scan.

SNMP-enabled printers can provide information through an SNMP interface. This information may be available as Management Information Base (MIB) objects. Each attribute of a printer can be identified by a unique identifier called as Object Identifier (OID). An OID can either have a single value or list of values. There are some standard MIBs, and printer vendors may be obliged to implement them and to provide the corresponding information by technology standards. Besides standard MIBs, vendors can use extended private MIBs. These MIBs can include vendor specific information. The patrol application can scan network printers using the SNMP scan. The SNMP scanner can look for SNMP enabled printers at each IP in a provided IP list using a SNMP query.

The patrol application can use open source implementation of SNMP for Java SNMP4J www.snmp4j.org. SNMP Scanner can scan network printers using this API. SNMP scanner can look for SNMP enabled printers at each IP in the provided IP list using SNMP query. The patrol application can include two XML files including the OIDs required to be scanned. One of the XML files can include detailed attributes. This XML file can contain the OIDs for newly discovered printers, and the other file can include attributes that are required for status reporting and print count scan categories. When the SNMP scanner finds an SNMP printer over an IP, it can try to retrieve OID values based on underlying OID file. The retrieved values can be appended to a scanned result XML file using an XML transformer and the scanned result XML file can be sent out to the server using an HTTPS client.

XML Transformer can transform the Configuration Plain Java Objects (POJOs), provided by the GUI component, to the XML configuration file. XML transformer can also transform XML configuration file to POJOs for the patrol application usage. XML transformer can further transform scanned results from different formats to an XML file, which can then be sent out to a server.

Non-network printers can be scanned using a NSDP Locator, which compliments a NSDP Monitor. The NSDP Monitor can run on network computers that have non-network printers attached to it. The NSDP Locator can search for each NSDP Monitor over each IP in the list, associated with the in-service printers. When a NSDP Monitor is found, NSDP locator can ask for the printer details which are gathered in form of Java objects. The Java objects can be transformed to XML using XML transformer and appended to the scanned result file. This file can be sent to the server using HTTPS client.

Jet Direct printers can be scanned using Printer Job Language (PJL) queries. Jet Direct print servers can list at a port, for example port 9001. When a Jet Direct scanner finds a Jet Direct printer at an IP, it can create Java socket with that IP at port 9001. PJL queries can be printed to the socket. The server can return query results which are appended to the scanned result file using XML Transformer.

The patrol application can also include a results compiler. An embodiment of the patrol application can be designed to follow the Inbox/Sent Items model for scanned results upload. As noted above, the patrol application can obtain scanned results from SNMP Printers, Jet Direct Printers and NSDP Printers. Each type of scan can send the scanned information in a different format to the patrol application. The scan result compiler can understand all these formats and can be designed to compile all of them using to a single resultant XML file using XML Transformer. The scanned result XML file can be saved to a outbox folder. A scan result file dispatcher can visit the outbox folder and dispatch all present scanned result files to the server. The scan result file dispatcher can be designed so that it leaves the scanned result file in the outbox, if the scanned result file is not successfully sent out. This design can aid in error recovery when there is a connectivity error between the server and the terminal. After a scanned result file is sent out to the server, it can be saved in a sent items folder. Whenever a scanned result file is compiled and copied to the outbox, it can trigger the dispatcher component, which is responsible for establishing HTTPS connection with the server. After the HTTPS connection is established, the dispatcher component can authenticate itself with the server using a predefined ID and password, stored in the configuration file. Successful authentication can trigger the transfer of the scanned result XML file from the patrol application to the server. A scanned result file can be sent as XML string over HTTPS. This XML string can be parsed to POJO after reception at server, validated and persisted.

The patrol application can also include a heartbeat sender component, which can include a pre-configured daemon that is invoked after a predetermined amount of time, for example every 60 minutes, to send a signal to the server. If, within a specified time frame, the server does not receive three consecutive heartbeat signals from an instance of the patrol application, it can send an email alert to technician. The alert includes the customer information and the location of patrol instance.

FIG. 1 of the present application, thus, illustrates an embodiment of the invention once information has been collected and is updated in a knowledge base. As noted above, certain embodiments of the inventive system and method disclosed in the present application can be secure and reliable and can maintain privacy. Certain embodiments of the inventive system and method disclosed in the present application can also comply with Regulatory requirements like HIPPA, FACTA, Sarbanes Oxley and may be less subject to accidental or intentional data corruption. Certain embodiments of the inventive system and method disclosed in the present application can further collect more complete information for benefit of client and internal analysis.

Certain embodiments of the inventive system and method are novel over the prior art, at least, for example, because it is not obvious to convert all SNMP data in as native a format as possible. Special important characters would be lost, and might be non-transportable without certain embodiments of this inventive method. Certain embodiments of the inventive system and method are novel over the prior art because they correct security and privacy issues would stem from badly handled system and are a non-obvious over the prior art because it is important that those issues be addressed. Certain embodiments of the inventive system and method are novel over the prior art because they directly take into account important laws like HIPPA, FACTA and Sarbanes Oxley. Certain embodiments of the inventive system and method are novel over the prior art because they correct or avoid significant data corruption during transport, and are non-obvious because it may be important to address data corruption in order to build a successful system. The "Transform and Transport" process discussed above and below can allow certain embodiments of the inventive system to increase the accuracy and efficiency of the enterprise printing process. The "Transform and Transport" process can allow companies to be better informed about their overall printing consumption because more complete data was gathered and collected. The "Transform and Transport" process can allow companies to better estimate their printing needs and better monitor the printer performance. The "Transform and Transport" process can further provide greater security to the underlying system and system data.

Figure 2:
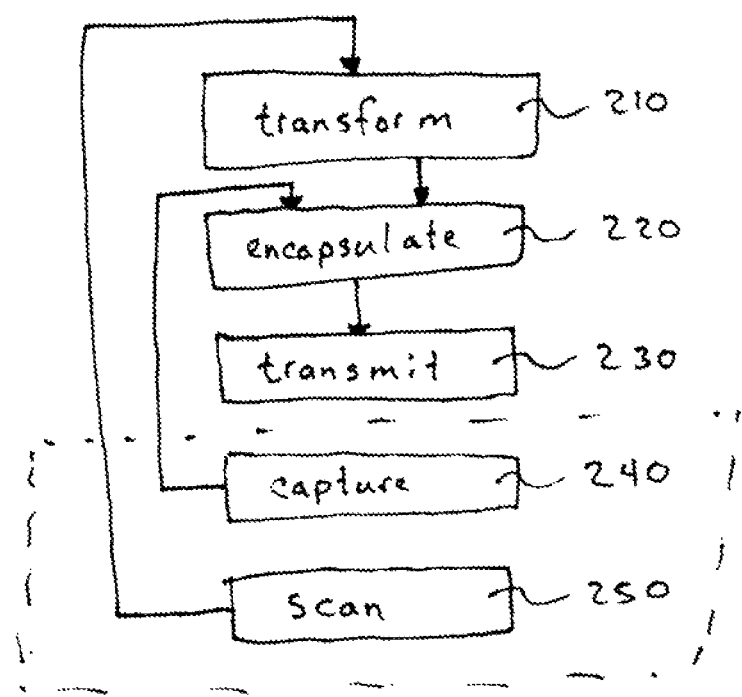
FIG. 2 illustrates a method according to an embodiment of the present invention.

FIG. 2 illustrates a method according to an embodiment of the present invention. The method includes transforming 210 printer data into an extensible markup language (XML). The method also includes encapsulating 220 the transformed printer data. The method further includes transmitting 230 the encapsulated printer data. The transforming 210 the printer data and the encapsulating 220 the printer data are configured to maintain security, reliability, and privacy of the printer data, especially during the transmission of the data.

The method can additionally include capturing 240 complete printer data by reading the encapsulated printer data. The method can also additionally include scanning 250 a network to obtain the printer data, before the transforming 210 of the printer data into the XML. The scanning 250 can include at least one of the following scans: a simple network management protocol scan, a non shared desktop printers scan, or a jet direct scan. The method can be implemented by a printer service provider configured to monitor printer usage within an enterprise.

The method can be implemented in software. For example, a computer-readable medium can be encoded with instructions that, when executed on a computer, perform the method. The computer-readable medium can be, for example, a hard disk, a compact disk (CD), a digital versatile disk (DVD), a flash Random Access Memory (RAM), or the like. The computer can be a general purpose computer, or another computing device, such as an application specific integrated circuit. The computer can be, in certain instances, a print server.

Figure 3:
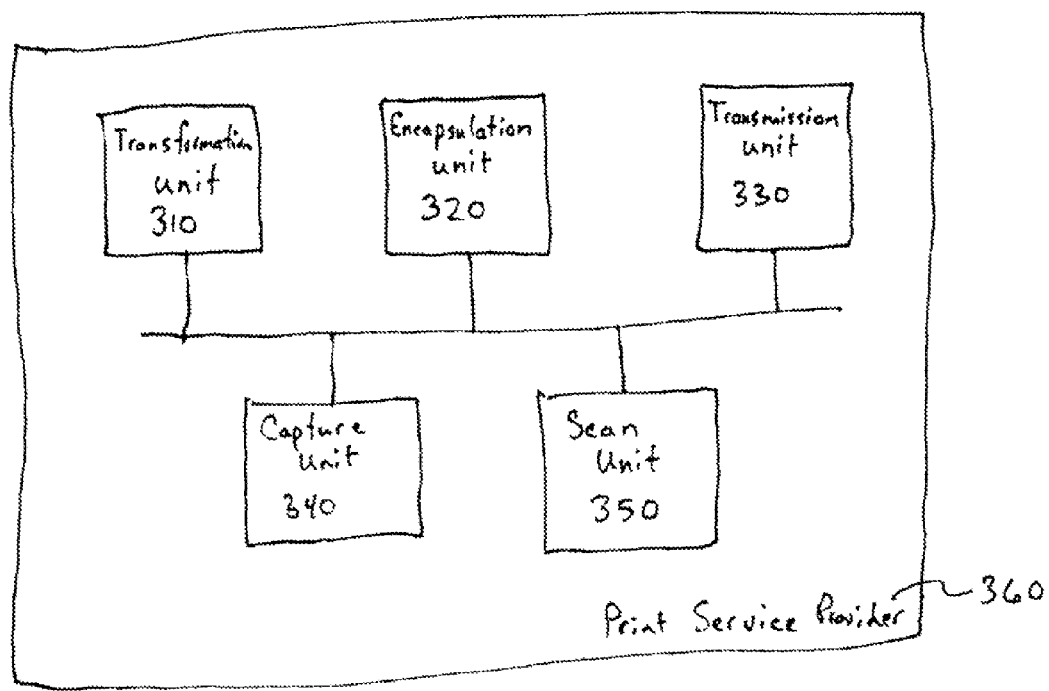
FIG. 3 illustrates an apparatus according to an embodiment of the present invention.

FIG. 3 illustrates an apparatus according to an embodiment of the present invention. The apparatus includes a transformation unit 310 configured to transform printer data into an extensible markup language (XML). The apparatus also includes an encapsulation unit 320 configured to encapsulate the transformed printer data. The apparatus further includes a transmission unit 330 configured to transmit the encapsulated printer data. The transformation unit 310 and the encapsulation unit 320 are configured to maintain security, reliability, and privacy of the printer data.

The apparatus can also include a capture unit 340 configured to capture complete printer data by reading the encapsulated printer data. The apparatus can also further include a scan unit 350 configured to scan a network to obtain the printer data, before transforming the printer data into the XML. The scan unit 350 can be configured to perform at least one of the following scans: a simple network management protocol scan, a non shared desktop printers scan, or a jet direct scan. The apparatus can include or be included in a printer service provider 360 configured to monitor printer usage within an enterprise.

Each of the transformation unit 310, encapsulation unit 320, transmission unit 330, capture 340, and scan unit 350 can be implemented as one or more computer processors, together with such further hardware as network cards and computer memory, as appropriate. The transformation unit 310, encapsulation unit 320, transmission unit 330, capture 340, and scan unit 350 are shown connected by a bus, but that particular configuration of elements is not mandatory. Indeed, a single processor can be configured, using—for example—software, to be each of transformation unit 310, encapsulation unit 320, transmission unit 330, capture 340, and scan unit 350 at different or overlapping periods of time. Thus, the architecture illustrated in FIG. 3 is simply one architecture and should not be considered to be limiting on the invention, the true scope of which is, by law, defined by the claims. No input/output devices are illustrated, though such devices may be valuable, particularly with respect to the scan unit 350 as it scans for printers.

It should be appreciated by one skilled in art, that the present invention may be utilized by any printer service provider that is required to monitor printer usage within an enterprise. The foregoing description has been directed to specific embodiments of this invention. It will be apparent; however, that other variations and modifications may be made to the described embodiments, with the attainment of some or all of their advantages. Therefore, it is the object of the present invention to cover all such variations and modifications as come within the true spirit and scope of the invention.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method for managing a plurality of printers connected to a network, the method comprising the following steps:
    scanning the network to obtain printer usage data from the plurality of printers wherein scanning is performed by at least one scan module wherein the at least one scan module gathers printer usage data from a plurality of printers and transmits the gathered printer usage data to a patrol application, wherein the at least one scan module comprises a first module and a second module, the first module configured to gather printer usage data from a first type of printer and the second module configured to gather printer usage data from a second type of printer;
    receiving the scanned data at the patrol application and compiling the scanned data into a single form and dispatching the single form from the patrol application to a server.

2. The method of claim 1, wherein the single form is extensible markup language (XML).

3. The method of claim 1, wherein dispatching the single form from the patrol application to a server utilizes a secure communications path.

4. The method of claim 1, wherein dispatching the single form from the patrol application to a server utilizes HTTPS.

5. The method of claim 1 wherein the first type of printer is one of the following: an SNMP-enabled printer, a non-networked printer, or a Jet Direct printer.

6. The method of claim 1 wherein the data transmitted by the first scan module is of a different type than the data transmitted by the second scan module.

7. The method of claim 1 wherein scanning the network further comprises storing the printer usage data in a first location and receiving the scanned data comprises checking the first location for the scanned printer usage data.

8. The method of claim 7 wherein checking the first location is done on a regular interval.

9. The method of claim 7 wherein checking the first location is done every minute.

10. The method of claim 7 wherein checking the first location is begun when printer usage data is stored in the first location.

11. The method of claim 1 further comprising removing the single form from the patrol application.

12. The method of claim 1 wherein dispatching the single form further comprises:
    authenticating with the server prior to sending the single form to the server.

13. An apparatus for managing a plurality of printers connected to a network, the apparatus comprising:
    a patrol unit configured to receive printer usage data gathered from the plurality of printers wherein the patrol unit is configured to:
    receive printer usage data from a printer in a first format and receive printer usage data from a second printer in a second format;
    compile the gathered printer usage data into a single form; and
    dispatch the single form to a server.

14. The apparatus of claim 13 wherein the patrol unit is further configured to receive printer usage data gathered from the plurality of printers by at least one scan unit.

15. The apparatus of claim 14 wherein the scan unit is configured to gather printer usage data from one of the following: an SNMP-enabled printer, a non-networked printer, or a Jet Direct printer.

16. The apparatus of claim 14 wherein the at least one scan unit comprises a first scan unit and a second scan unit, wherein the first scan unit provides printer usage data to the patrol unit in the first format and the second scan unit provides printer usage data to the patrol unit in the second format.

17. A non-transitory computer-readable medium encoded with instructions that, when executed on a computer, perform a process for managing a plurality of printers connected to a network, the process comprising the following steps:
    scanning the network to obtain printer usage data from the plurality of printers wherein scanning is performed by at least one scan module wherein the at least one scan module comprises a first scan module and a second scan module, wherein printer usage data gathered by the first scan module is in a first format and printer usage data gathered by the second scan module is in a second format, the scan module configured to transmit the gathered printer usage data to a patrol application;
    receiving the scanned data at the patrol application and compiling the scanned data into a single form; and
    dispatching the single form from the patrol application to a server.

18. The computer-readable medium of claim 17, wherein the at least one scan module is configured to scan one of the following: an SNMP-enabled printer, a non-networked printer, or a Jet Direct printer.

* * * * *